United States Patent

[11] 3,603,866

| [72] | Inventor | Kenneth E. Opal<br>845 Fifth St., Oakmont, Pa. 15139 |
|---|---|---|
| [21] | Appl. No. | 22,283 |
| [22] | Filed | Mar. 24, 1970 |
| [45] | Patented | Sept. 7, 1971 |

[54] ENERGIZING SYSTEM WITH DIGITAL CONTROL CIRCUIT FOR REGULATING MULTIPHASE INVERTER
11 Claims, 24 Drawing Figs.

[52] U.S. Cl. .................................................. 321/45 R,
321/9 A, 321/27 MS, 318/227
[51] Int. Cl. .................................................. H02m 7/48
[50] Field of Search .......................................... 318/227,
231; 321/9, 9 A, 27, 27 M, 45

[56] References Cited
UNITED STATES PATENTS

| 3,321,661 | 5/1967 | Toth et al. ............... | 318/227 X |
| 3,321,687 | 5/1967 | Toth ........................ | 318/227 X |
| 3,378,751 | 4/1968 | Walker .................... | 321/27 MS |
| 3,409,817 | 11/1968 | Gillett ...................... | 321/9 A |
| 3,439,242 | 4/1969 | Gasser ...................... | 321/27 MS |
| 3,515,967 | 6/1970 | McLaughlin et al. ........ | 318/227 X |
| 3,538,405 | 11/1970 | Borden et al. .............. | 318/227 X |

*Primary Examiner*—William M. Shoop, Jr.
*Attorneys*—Donald W. Banner, William S. McCurry and John W. Butcher ABSTRACT: A two-phase electrical motor is driven by two separate inverter circuits under the regulation of a digital control circuit which provides and maintains a phase displacement between the inverter output voltages by utilizing a countdown circuit in connection with a basic clock circuit. The inverter AC output voltages include a plurality of pulses of the same polarity in each half-cycle to provide a resultant AC output voltage related to the clock frequency by another countdown circuit. Pulse duration is controlled to regulate the effective amplitude of the resultant AC output voltages. A chopper circuit prevents voltage swings in a varying DC supply from occurring in the DC input voltage which energizes the inverter circuits.

PATENTED SEP 7 1971 3,603,866
SHEET 1 OF 4
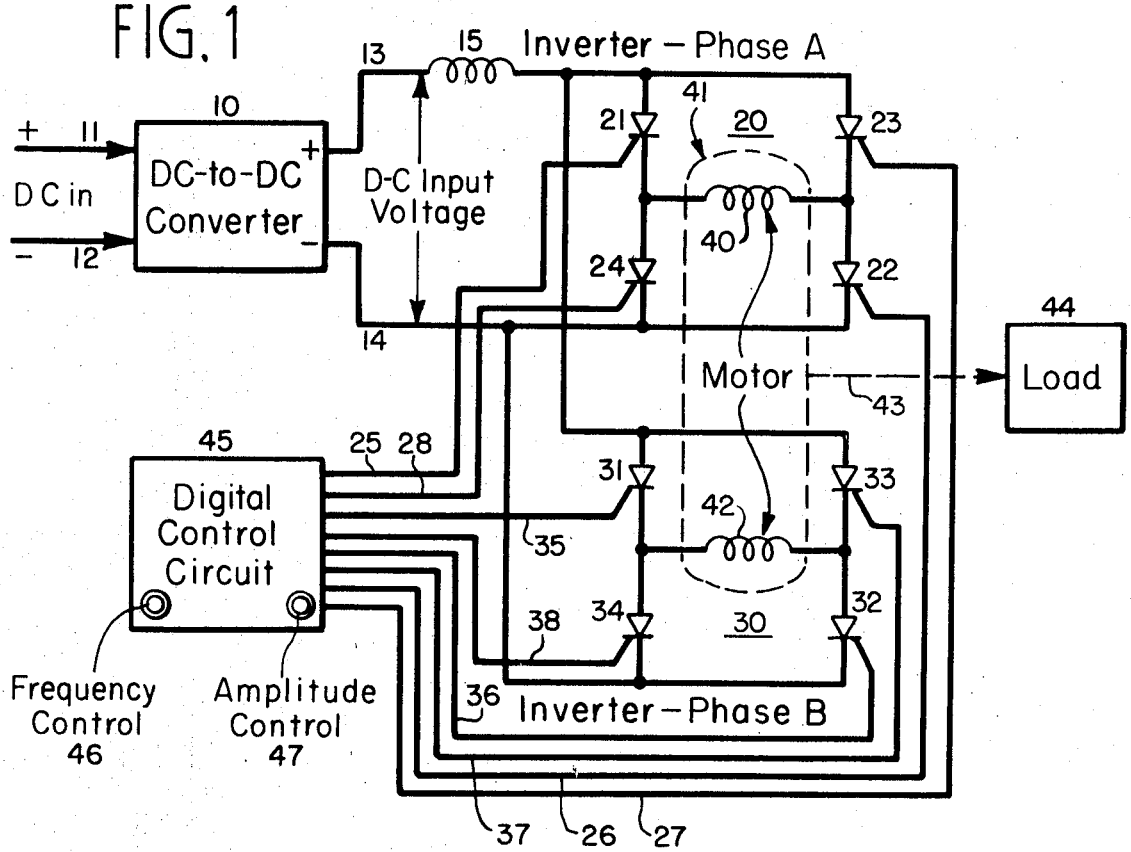
FIG. 1
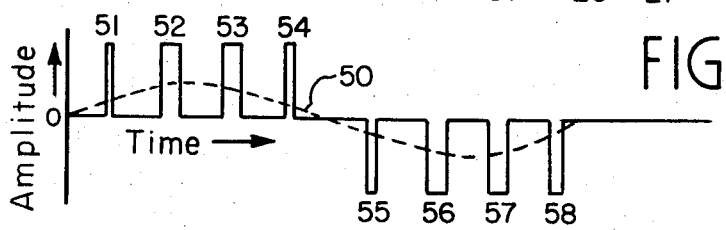
FIG. 2a
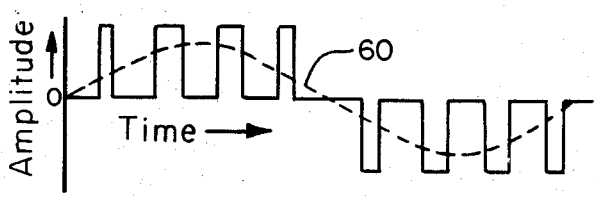
FIG. 2b
FIG. 2c
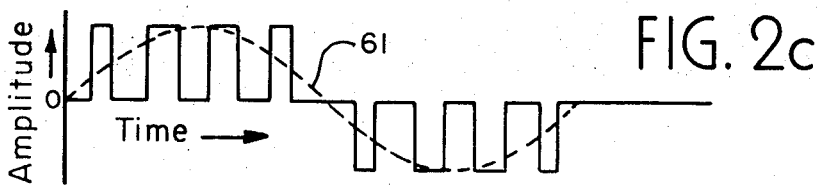
FIG. 2d
Inventor
Kenneth E. Opal
By James J. Jennings Jr.
Attorney Inverter 20-Phase A Inventor
Kenneth E. Opal
By *James J. Jennings, Jr.*
Attorney Inventor
Kenneth E. Opal 3,603,866

ENERGIZING SYSTEM WITH DIGITAL CONTROL CIRCUIT FOR REGULATING MULTIPHASE INVERTER

BACKGROUND OF THE INVENTION

In the AC motor control art it has been known to drive various loads from a two-phase motor, that is, a motor which has two separate electrical windings designed to be energized by two different AC voltages displaced in phase by 90° relative to each other. This can be done by providing two sea rate inverter circuits, the first energized by a DC voltage to provide a first AC output voltage for energizing the first motor winding, and the second likewise energized from the same DC voltage to produce a second AC voltage for energizing the other motor winding. Frequently such arrangements have proved complex and expensive in generating the desired AC voltages and maintaining the 90° phase shift with precision. Conventional analogue techniques and circuits have frequently been employed with arrangements such as a phase-lock oscillator to maintain the desired phase displacement.

It is accordingly a principal consideration of the present invention to provide an energizing system with a digital control circuit for regulating the generation of two resultant AC output voltages displaced in phase relative to each other.

It is a corollary consideration of this invention to utilize digital techniques and circuits to provide a plurality of similar-polarity pulses in each half-cycle of the AC output voltages, thus producing a resultant AC output voltage of the appropriate frequency and effective amplitude level to energize AC loads such as two separate motor windings of a two-phase motor.

SUMMARY OF THE INVENTION

A system for energizing first and second AC loads in accordance with the present invention from DC input voltage provides first and second resultant AC output voltages displaced in phase from each other. Each AC output voltage has a plurality of pulses in each half-cycle to produce the resultant AC voltage. The energizing system includes a first inverter circuit connected for energization by the DC input voltage, and this inverter circuit comprises four controllable semiconductor switches connected to regulate both the direction and the level of current flow through the first AC load as different pairs of the semiconductor switches are rendered conductive. A second inverter circuit is likewise provided and connected for energization by the DC input voltage. This second inverter circuit includes four controllable semiconductor switches connected to regulate both the direction and the level of current flow through the second AC load ad different pairs of the semiconductor switches in the second inverter circuit are rendered conductive.

Particularly in accordance with the present invention a digital control circuit is provided and connected to control the times of conduction of the controllable semiconductor switches. Such digital control circuit includes first and second countdown circuits. The first countdown circuit is connected to determine the number of pulses in each half-cycle of the resultant AC output voltages. The second countdown circuit is connected to maintain the resultant AC output voltages displaced in phase with respect to each other by a predetermined amount.

THE DRAWINGS

In the several figures of the drawings like reference numerals identify like elements, and in those drawings:

FIG. 1 is a block diagram, partly in schematic form, illustrating principal portions of the inventive system;

FIGS. 2a–2d are graphical illustrations useful in understanding the operation of the system depicted in FIG. 1;

GENERAL DESCRIPTION OF THE INVENTION

Figure 3:
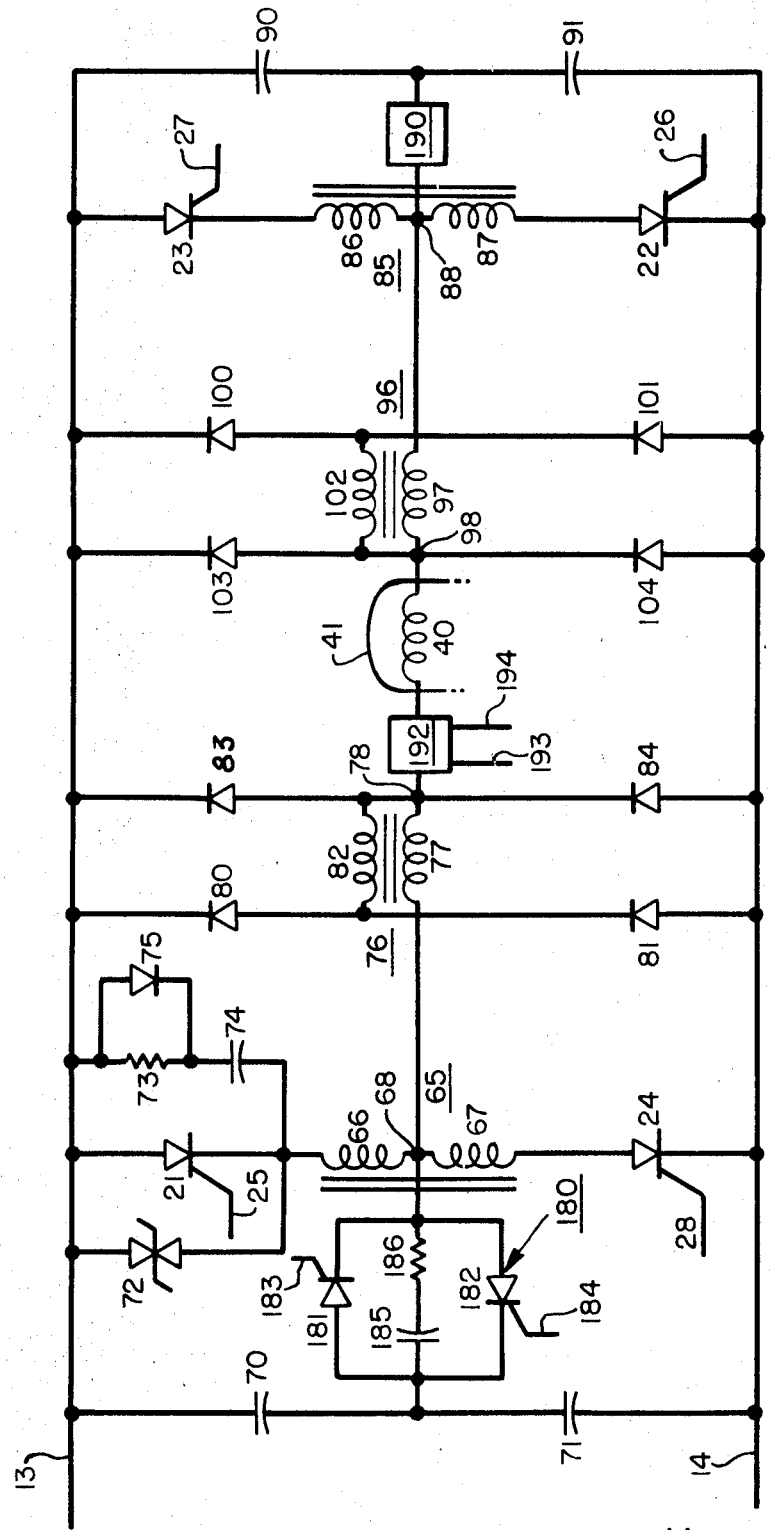
FIG. 3 is a schematic diagram illustrating an inverter circuit suitable for operation with the inventive system.

FIG. 1 depicts a general arrangement in which a chopper or DC to DC converter circuit 10 is provided to minimize wide swings in a DC supply voltage provided over input conductors 11 and 12 and produce a DC input voltage on conductors 13 and 14 for energizing a pair of inverters 20 and 30. Such a chopper or DC to DC converter is a unit well known and understood in this art and is only illustrated in FIG. 1 to indicate its connection in a system where excessive swings in the amplitude of a DC supply voltage should be reduced before providing the DC input voltage which actually energizes the inverters. Inductor 15 is coupled between conductor 13 and inverter circuit 20 to further reduce undesired voltage fluctuations. Thus the chopper and inductor 15 are not considered essential components of this invention.

The first inverter circuit 20, designated "Inverter-Phase A" in the drawing, includes four controllable semiconductor switches 21–24 connected to regulate both the direction and the level of current flow through a first AC load 40 as different pairs of the semiconductor switches 21–24 are rendered conductive The first AC load 40 is depicted as one winding of a two-phase AC motor 41, which comprises a second winding 42. Although in a preferred embodiment the present invention is illustrated with motor 41 couples over a shaft represented by broken line 43 to drive any suitable load 44, those skilled in the art will appreciate that the two AC loads 40, 42 may, in fact, be any suitable load other than phase windings of a motor. Those skilled in the art will appreciate there are additional components, such as those utilized to commutate and to protect the semiconductor switches 21–24 and 31–34 in each of the inverter phase circuits, but for the purposes of simplicity in the general description these components are omitted from the general showing in FIG. 1. The controllable switches are depicted as silicon-controlled rectifiers (SCR's), but of course may be transistors, power transistors, or any other suitable controllable semiconductor switch.

Particularly in accordance with the present invention a digital control circuit 45 is provided to regulate the respective times of conduction and nonconduction of all the controllable semiconductor switches 21–24 and 31–34. To effectuate this regulation, control lines 25–28 are shown intercoupling output portions of the digital control circuit 45 with the gates of controllable switches 21–24. Similarly, control conductors 35–38 intercouple other circuits of digital control circuit 45 with the control electrodes of the other switches 31–34. Although a single control conductor is shown between the digital control circuit and the control electrode of each switch, those skilled in the art will appreciate that a plurality of conductors may actually be utilized and other components, such as gating transformers, can be intercoupled in such circuits.

A frequency control adjustment knob 46 is depicted in digital control 45. Such a control means is provided to afford regulation of the timing of the firing pulses translated over the conductors 25–28 and 35–38 to regulate the on and off times of the controllable semiconductor switches. This frequency control unit can be a simple frequency adjustment within a basic clock or oscillator circuit. An amplitude control knob 47 is also shown in the digital control unit 45. In a preferred embodiment of this invention the amplitude control can be effected by a pair of bilevel adjustable delay circuits connected to regulate the pulse widths of several pulses of the same polarity during each half-cycle of inverter operation, thus regulating the effective amplitude of the composite or resultant AC output voltage. It should however be emphasized at the outset that regulation of the amplitude is a necessary concomitant of practicing the present invention. In those motor control systems where it is desired to maintain a constant output torque by producing a relatively constant flux density in the motor, the amplitude of the applied AC voltage is usually varied proportionately with any regulation of the frequency of this AC energizing voltage. This is conventionally termed "constant volts-per-cycle" operation. However in some systems it may be sufficient to obtain precise speed control of the output shaft and allow the torque to drop off by adjusting only the frequency of the gating signals provided by the digital control circuit, while allowing the AC output voltage to be maintained at a constant level as determined by the difference in potential of the DC input voltage applied over conductors 13, 14. Accordingly it will be understood that although a method of amplitude control and effective pulse width modulation is described, it is not a basic prerequisite to the inventive combination.

FIGS. 2a-2d illustrate the production of the composite or resultant AC output voltages from the inverter circuits 20, 30 by selective regulation of the firing pulses applied over conductors 25-28 and 35-38 from the digital control circuit. By way of example in FIG. 2a broken line 50 indicates a first resultant AC output voltage such as may be provided by regulating the conduction and nonconduction of the switches 21-24 in the first inverter circuit 20. Those skilled in the art will appreciate that the idealized showing of the resultant AC voltage represented by the waveform 50 does not in fact occur, but as the individual pulses 51-58 of varying width and constant amplitude are applied to the first winding 40 of the motor, because of the inductive nature of the load the motor winding "sees" an energizing voltage which approximates that of waveform 50.

Considering the phase A inverter circuit 20 for energizing the upper motor wind winding 40, and without going into extensive detail as will be done hereinafter in connection with FIGS. 4 and 5, it is assumed that SCR 24 first receives a gate pulse over gate drive conductor 28 and this pulse is maintained during the first half-cycle of the composite AC output voltage 50 shown in FIG. 2a. At a later time determined by the circuits and the adjustments in digital control circuit 45, SCR 23 is gated on over conductor 27 to provide the positive-going leading edge of the pulse 51 as current flows from input conductor 13 through SCR 23, over winding 40 and through SCR 24 to the other input conductor 14. To terminate pulse 51, a short gating pulse is applied over line 26 to trigger on SCR 22, which commutates SCR 23 off in a manner to be described herein after in connection with FIG. 3, and SCR 22 is itself extinguished by reason of lack of both gate drive and an anode-cathode energizing potential difference. SCR 24 still receives gate drive and at a later time SCR 23 is gated on again to provide the leading edge of pulse 52. When SCR 22 is again triggered to commutate SCR 23 off, the trailing edge of this pulse 52 is provided. Similarly, as SCR 24 still receives the same gate drive, pulses 53 and 54 are provided by gating SCR 23 on and maintaining it on for the desired pulse length, with termination of the pulse being produced by a short gating pulse applied over conductor 26 to SCR 22. At the end of the first half-cycle of the resultant AC output voltage 50, gate drive is removed from SCR 24.

To initiate the next half-cycle of operation, a suitable extended-duration gating pulse is applied over conductor 26 to the gate of SCR 22 during the time interval in which the pulses 55-58 are produced. The leading edge of the first negative-going pulse 55 is thereafter provided by applying a suitable gating pulse over conductor 25 to gate on SCR 21, allowing current to flow from input conductor 13 through SCR 21, motor winding 40, and SCR 22 to the other input conductor 14. A short gating pulse is thereafter applied over conductor 28 to momentarily switch on SCR 24 and gate off SCR 21 to provide the trailing edge of the pulse 55. This turn-on of SCR 21 and turnoff over SCR 24, while SCR 22 is accomplished three additional times to provide the pulses 56, 57 and 58 of the desired widths or time durations.

FIG. 2b and 2c indicate the operation of the inverter to provide modifications in the effective level of the resultant AC output voltage as the amplitude control adjustment 47 in digital control circuit 45 is changed. By turning the amplitude control knob to produce an increased amplitude of the resultant AC voltage, the waveform depicted by broken line 60 in FIG. 2b is approximated by applying the pulses shown in that figure to the motor winding. Thus it is apparent that although the knob 47 is labeled "amplitude control" in FIG. 1, the adjustment of this knob affects the pulse width or time duration of the individual pulses in each half-cycle to provide a corresponding modification of the effective amplitude of the composite AC voltage "seen" by the motor winding. A further increase in the pulse width produces the enhanced amplitude signal 61 depicted in FIG. 2c.

In a similar manner adjustment of the frequency control knob 46 in FIG. 1 is effective to vary the time of one half-cycle of the resultant AC wave produced by each separate inverter. As shown in FIG. 2d, the resultant AC wave depicted by broken line 62 is produced by decreasing the frequency or increasing the time duration of a complete cycle of operation. In the illustrated circuit this means that initially SCR 24 is maintained on for a longer time period, and thereafter the other SCR 22 in the lower portion of inverter circuit 20 is similarly maintained on for this longer time period period to produce the longer duration operation or decreased frequency as depicted in the drawing.

Inverter 20-Phase A

FIG. 3 shows one suitable arrangement for the inverters, and connections specific to that shown as phase A or inverter 20 are illustrated. As there shown, motor winding 40 is coupled in the center of the circuit, and each of the SCR's 21-24 with their associated turn-on conductors 25-28 coupled to the respective gates are also indicated. Energizing input conductors 13 and 14 supply a unidirectional operating potential, or a DC input voltage, in a well-known manner.

To the left side of motor winding 40, a commutating choke assembly 65 is shown coupled in series between SCR's 21 and 24. The commutating choke includes an upper winding 66 and a lower winding 67 connected to a common terminal 68. A pair of commutating cap capacitors 70 and 71 are coupled in series as shown between conductors 13 and 14. The common connection between capacitors 70, 71 is coupled in series as shown between conductors 13 and 14. The common connection between capacitors 70, 71 is coupled over a commutating pulse control circuit 180 to the common connection 68 at the midpoint of the commutating choke assembly 65. Circuit 180 includes SCR's 181, 182 connected in opposition as shown, and a protective circuit comprising capacitor 185 and resistor 186 is coupled in parallel with these two SCR's. SCR 181 is gated on in timed coincidence with SCR 24 by application of an appropriate signal over conductor 183. This completes an obvious discharge circuit for commutating capacitor discharge circuit for commutating capacitor 71 to turn off previously conducting SCR 21. After one half-cycle, or the rise and initial decay of the discharge current from capacitor 71, SCR 181 is switched off to prevent "ringing" or oscillation at the high frequency at which this circuit is pulsed. Similarly, a gating pulse is applied over conductor 184 to switch on SCR 182 concomitantly with application of a trigger pulse over conductor 25 to gate on SCR 21. In exactly the same way SCR 182 is rendered nonconductive after one half-cycle to prevent ringing at the pulsing frequency. The other commutating pulse control circuit 190, depicted in block form between the common connection of commutating capacitors 90, 91 and the center tap connection of the commutating choke 85, includes components similarly connected and operated to effect the same end. Because this prevention of ringing is an additional feature, and to simplify explanation of the basic inverter circuit and pulse width regulation, the commutating pulse control circuits 180, 190 will not be mentioned hereinafter.

To the left of SCR 21 a selenium surge suppressor unit 72 is coupled in parallel with SCR 21 to protect this semiconductor switch against high voltage transients. Another parallel circuit around SCR 21 is comprised of resistor 73 coupled in series with a capacitor 74, and a diode 75 is coupled in parallel with resistor 73. This circuit 73–75 protects SCR 21 against high dv/dt changes. Protective components identical to 72–75 are provided for each of the other SCR's 22–24, but such components are not shown in FIG. 3 to simplify the explanation. A spillover transformer 76 is provided as shown, with its primary winding 77 coupled between connection 68 and another connection 78, shown as a common connection between spillover diodes 83, 84 connected between conductors 13, 14 in a well-known manner. Secondary winding 82 of the energy return transformer 76 has one end of the winding coupled to the common connection 78 between the spillover diodes 83, 84 and the other end coupled to the common connection between energy return diodes 80, 81. The circuitry to the right of motor winding 40 in FIG. 3 is the same as that on the left, and reference characters 85–104 designate these addition components.

Between motor winding 40 and connection point 78 is a current-sensing device 192, connected to provide a signal over conductors 193, 194 related to the level of of current flow through motor winding 40. This signal is useful in conjunction with a current control circuit (not shown) to switch off the conducting SCR's in the event the pulse width is made too long and the rated or preset current level is exceeded. Device 192 may take different forms (such as a current-sensing winding), depending on the frequency of the current in winding 40.

In operation an extended duration gating pulse is first applied over conductor 28 to SCR 24 at the beginning of a half-cycle of operation, as described in connection with FIG. 2. At a later time a trigger pulse is applied over conductor 27 to SCR 23, completing a path for current flow from conductor 13 over SCR 23, the upper winding 86 of commutating choke assembly 85, primary winding 97 of spillover transformer 96, winding 40 components two-phase motor 41, primary winding 77 of spillover transformer 76, lower winding 67 of the other commutating choke assembly 65, and SCR 24 to input conductor 14. This current flow produces the pulse referenced 51 in FIG. 2a. This pulse is terminated by applying a short-duration gating pulse over conductor 26 to turn on SCR 22, completing a path for current flow for the discharge current from capacitor 91 which SCR'a holdoff voltage over the commutating choke assembly 85 to turn off SCR 23. As SCR 23 is switched off and the trigger pulse is removed from conductor 26, both SCR's 23 and 22 are turned off. Any reactive current then flowing in motor winding 40 continues to flow through SCR 24 and diodes 101, 104. This operation is repeated in a cyclical manner. The various inverter components and their operation are all well known and understood in this art and not further explanation is deemed necessary to a full understanding and practice of this invention.

Digital Control Circuit 45: Circuit Arrangement

Figure 4:
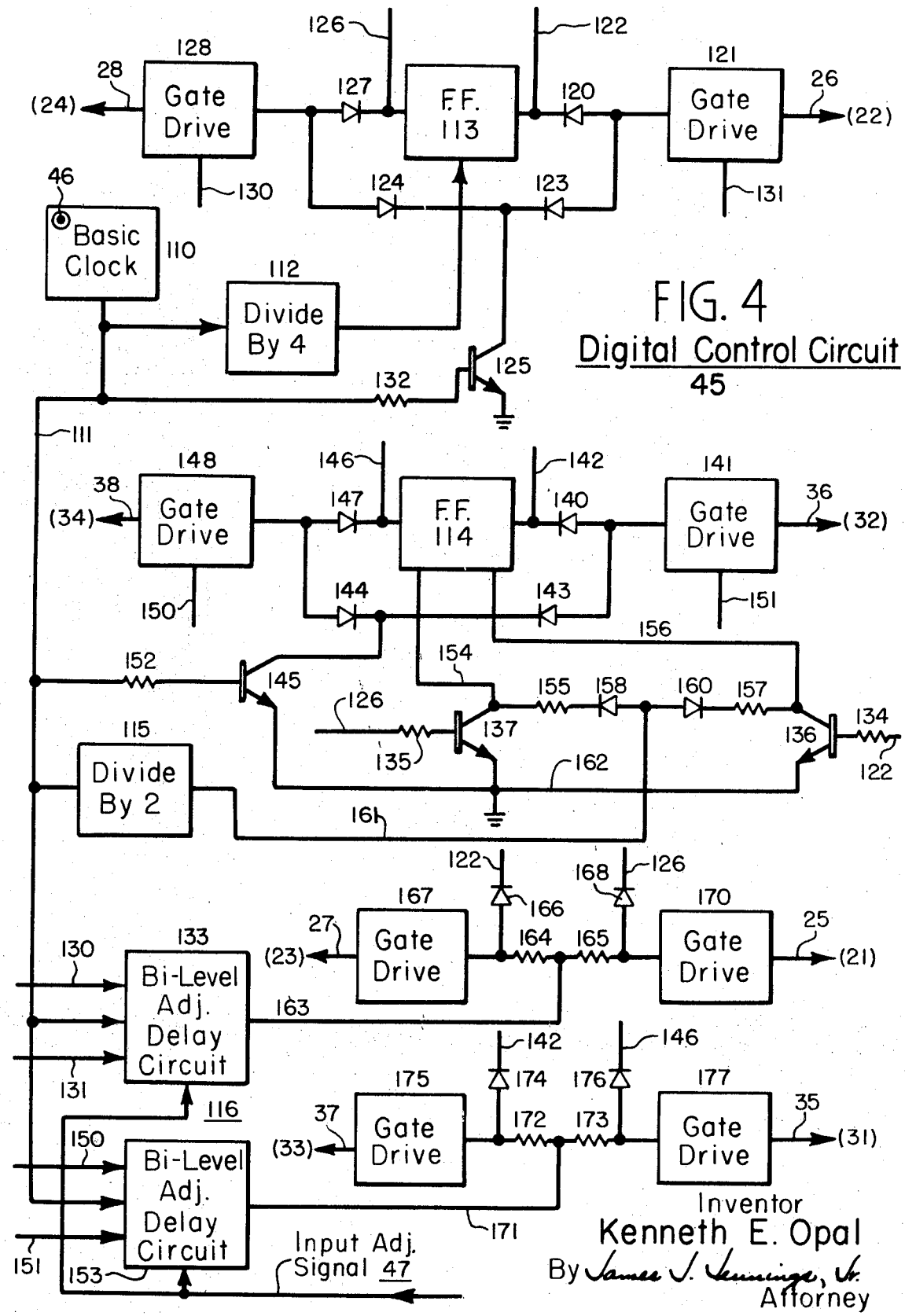
FIG. 4 is a block diagram, partly in schematic form, depicting details of the digital control circuit shown generally in FIG. 1.
Figure 5:
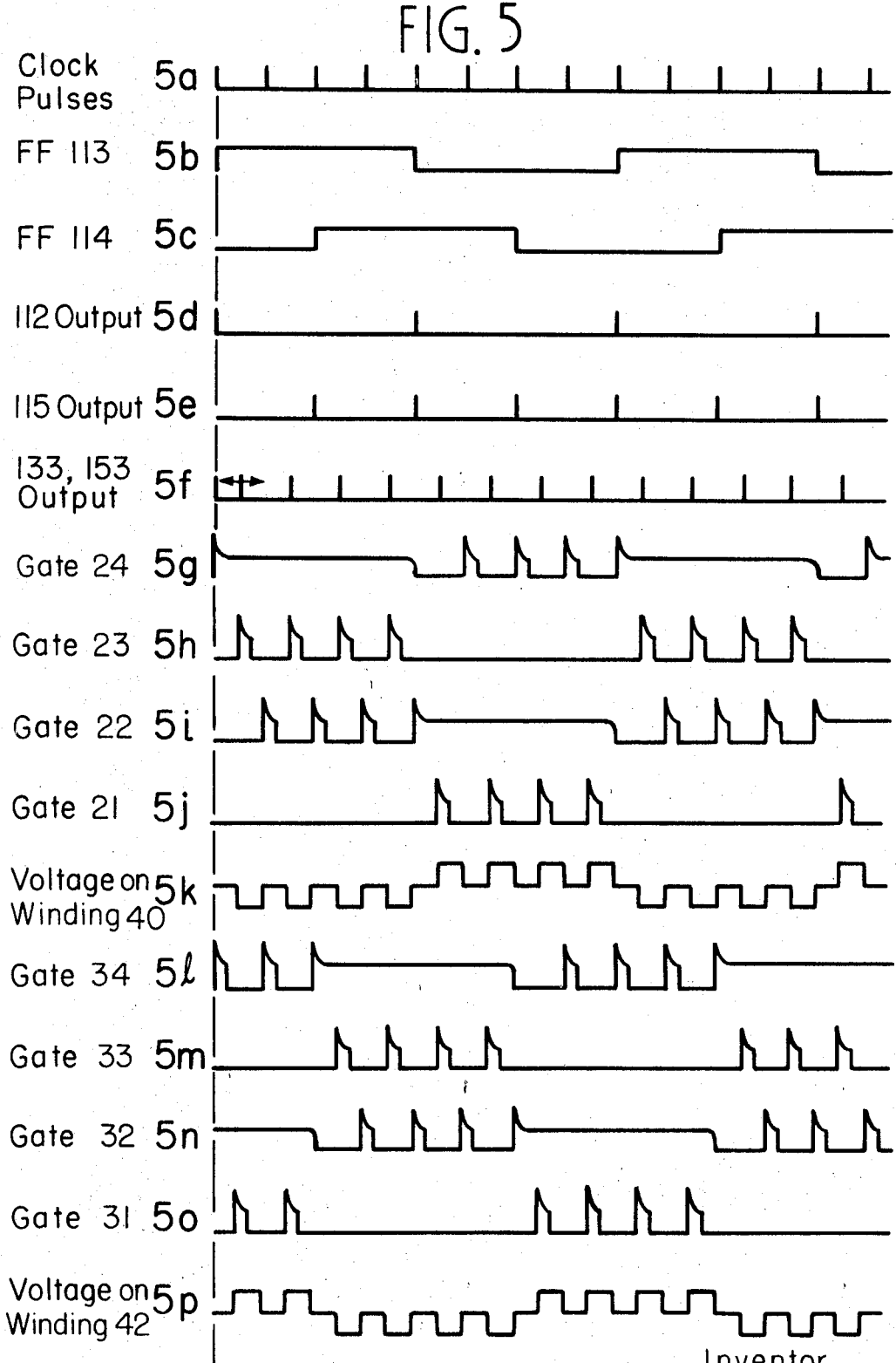
FIGS. 5a–5p are graphical illustrations useful in understanding operation of the digital control circuit depicted in FIG. 4.

The timing and logic arrangement 45 depicted in FIG. 4 is a salient component of the inventive combination. This digital control circuit includes an oscillator or basic clock circuit 110 connected to provide a train of timing pulses on conductor 111, which pulses are variable in frequency by the adjustment means referenced 46 in the basic clock circuit. A first countdown unit, shown as a "divide by 4" circuit 112, is coupled between conductor 111 and the control input connection of a toggle or JK type flip-flop 113. This flip-flop is connected to determine the time periods during which extended-duration gating pulses are applied to the SCR's 22 and 24, and in conjunction with another flip-flop 114 and another countdown circuit depicted as "divide by 2" circuit 115, also regulates the gate pulses applied to the SCR's 32, 34. The second flip-flop 114 is a set-reset or RS-type flip-flop. A bilevel adjustable delay circuit 116, which has bilevel control of the on-pulse time, is shown in the lower left portion of FIG. 4. However it is again emphasized that the invention has utility and is effective without such an arrangement where only the frequency of the output pulses is to be regulated without any requirement of pulse width regulation or modulation of the effective amplitude of the resultant AC output voltage.

Continuing the circuit description of FIG. 4, the right side of flip-flop 113 is coupled through a diode 120 and a gate drive amplifier unit 121 to conductor 26 for passing gating or trigger signals to SCR 22. A conductor 122 is coupled between diode 120 and flip-flop 113, and another diode 123 has its anode coupled between gate driver 121 and diode 120, and its cathode coupled to the common connection between another diode 124 and the collector of an NPN-type transistor 125. Another conductor 126 is coupled between the left side of flip-flop 113 and another diode 127, and the other side of this diode is coupled to another gate driver 128 for providing trigger pulses over conductor 28 to SCR 24. Another connection 130 is extended from gate drive circuit 128, and a similar connection 131 is made to the other gate driver 121. A resistor 132 is coupled between timing input conductor 111 and the base or input electrode of transistor 125. Conductors 130 and 131 extend control signals from the gate drivers 128, 121 to input connections of adjustable delay circuit 133. Conductors 122, 126 pass control signals as shown over the respective resistors 134, 135 to the bases of NPN-type transistors 136, 137, and also pass these signals to diodes 266, 168 in the circuit which regulates application of the trigger pulses to semiconductor switches 21, 23.

Those components in the circuit adjacent flip-flop 114 similar to and similarly connected as respects the units just described in connection with flip-flop 113, are similarly numbered in the series 140–152 to simplify the description. It is noted that signals from the gate driver amplifiers 141, 148 are applied over conductors 150, 151 to the input of bilevel adjustable delay circuit 153. State-indicating signals are passed from flip-flop 114 over conductors 142, 146 to diodes 174, 176 in the delay trigger circuit arrangement shown in the lower portion of FIG. 4. The R connection of flip-flop 114 is coupled over a conductor 154 to the common connection between the resistor 155 and the collector of transistor 137. This S connection of flip-flop 114 is coupled over another conductor 156 to the common connection between the collector of transistor 136 and another resistor 157. The cathodes of diodes 158 and 160 are respectively connected to resistors 155, 157 as shown, and the common connection between the anodes of these diodes is coupled over a conductor 161 to the output side of "divide by 2" circuit 115. The emitters of all of transistors 136, 137 and 145 are coupled to ground over a common conductor 162.

In the delay or amplitude-regulating portion of the circuit shown in FIG. 4, the output signal from bilevel adjustable delay circuit 133 is applied over conductor 163 to the common connection between resistors 164, 165. Resistor 164 has its other side coupled to the common connection between diode 166 and a gate driver 167, the output side of which is connected to pass a gating signal over conductor 27 to SCR 23. The other side of resistor 165 is coupled to the common connection between diode 168 and the input side of gate drive circuit 170, the output side of which is connected to pass a trigger pulse over conductor 25 to gate on SCR 21.

The output side of adjustable delay circuit 153 is coupled over a conductor 171 to the common connection between resistors 172, 173. The other side of resistor 172 is coupled to the common connection between diode 174 and another gate driver 175, which operates to provide gating signals over conductor 37 to regulate semiconductor switch 33. The other side of resistor 173 is coupled to the common connection between diode 176 and another gate drive circuit 177, which in turn provides trigger signals over conductor 35 to regulate the conduction of SCR 31.

Digital Control Circuit 45: Operation

In its operation the digital control depicted in FIG. 4 is synchronized by a series of oscillator or clock pulses, represented in FIG. 5a, provided from circuit 110 over conductor 111. The frequency of these pulses is adjustable by knob 46 in the clock circuit 110 in a well-known manner. To describe the operation of the invention it is convenient to consider a system which includes timing pulses from he basic clock circuit at a frequency eight times the frequency at which it is desired to drive the motor, or the AC loads represented by the windings 40,42. Thus if 60-Hertz operation of the load is desired, the frequency of the pulses from he basic clock circuit is 480 Hertz. Considering that eight timing pulses are applied over conductor 111 to all the various circuits during each full cycle of the resultant AC voltage, it will be apparent to those skilled in the art that "divide by 4" circuit 112 is in the broader sense a countdown circuit which is connected to regulate the number of pulses, such as 51–54 in FIG. 2a, of a given polarity which occur during one half-cycle of the AC output voltage. It will likewise be apparent that the "divide by 2" circuit 115, although shown as a specific circuit, is in the broader sense a countdown circuit connected to establish and maintain the desired phase relationship between the two AC resultant voltages applied respectively to the AC loads 40 and 42.

Considering now the uppermost portion of FIG. 4 including JK flip-flop 113 and divide by 4 circuit 112 it is apparent that all of the timing pulses from basic clock circuit 110 pass over conductor 111 and are applied to the input side of countdown circuit 112. With every fourth timing pulse an output pulse passes from circuit 112, as shown in FIG. 5d, to change the state of flip-flop 113. One output connection of this flip-flop is high and the other is low, and this state is changed with every fourth clock pulse as represented by FIG. 5b. It is assumed, to coordinate the description with the illustrative waveform in FIGS. 5a–5p, that at the outset the signal at the output side of countdown circuit 112 is applied to flip-flop 113, making the right output of flip-flop 113 high, and the left output of stage 113 low at this time. Because of the sense in which diode 127 is connected between the gate drive circuit 128 and flip-flop 113, a low signal at the output side of flip-flop 113 provides a signal through the gate drive circuit 128 which passes a gate drive signal over conductor 28 to SCR 24 as represented in FIG. 5g. At the same time, with the right side of stage 113 high, there is no signal through the gate drive circuit 121 over conductor 26 and thus there is no drive to the gate of semiconductor switch 22, as represented by FIG. 5i. However, as shown in FIG. 5i, for each subsequent input or timing pulse received over conductor 111, until the time that continuous gate drive is applied to SCR 22, there is a momentary gate drive pulse over conductor 26 with each timing pulse. This is accomplished by passage of the timing pulse signal through resistor 132 to the base of transistor 125, rapidly driving this transistor on and clamping the point between diodes 123, 124 to ground. This produces a low-level signal at the input of gate drive circuit 121 for the duration of the basic clock pulse, and it is this operation which produces momentary triggering of SCR 22 to commutate SCR 23 off and then allow both SCR's 22 and 23 to be turned off as previously described. At a later time, after the extended duration gating pulse is applied over conductor 26 to gate 22 as shown in FIG. 5i, the clock pulses will still clamp the point between diodes 123, 124 to ground and produce momentary gating signals over gate drive circuit 128 to briefly switch SCR 24 on and commutate SCR 21 off. This operation has been previously described in connection with the operation of the inverter circuit 20 in FIG. 3.

Considering now the operation of the RS flip-flop stage 114, the main difference between the regulation of this stage and that of the JK flip-flop 113 is that the state of flip-flop 114 is determined in accordance not only with the output signal provided by the countdown stage 115 over conductor 161 and shown in FIG. 5e, but also by the state of flip-flop 113 as indicated over conductors 122, 126. As previously noted when operation is commenced the right side of flip-flop 113 is high, and this high-level signal is passed over conductor 122 and resistor 134 to the base of transistor 136, rendering this transistor conductive and effectively clamping the S or right input of flip-flop 114 to ground. This means that any output signal from countdown circuit 115 applied over conductor 161 at this time cannot pass over conductor 156 to change the state of flip-flop 114, because it is grounded out by transistor 136. Instead, it is apparent that with these connections the state of flip-flop 114 will be changed after the state of flip-flop 113 is changed, but only after the additional delay of two timing pulse periods or one output signal from "divide by 2" circuit 115. The switching of flip-flop 114 is shown in FIG. 5c, delayed by 90° relative to the switching of flip-flop 113. Transistor 145 operates in a manner similar to that of transistor 125 to provide the short-duration commutation pulses to that one of the SCR's 32, 34 which is not receiving continuous gate drive when the timing pulse is received over conductor 111 and resistor 152.

In the lower portion of FIG. 4 the drive or trigger pulse circuits for the control electrodes of semiconductor switches 21, 23, 31 and 33 are illustrated. The precise times of occurrence of the leading and trailing edges of pulses 51–58 in FIG. 2a, or the effective width of each pulse, are determined by delaying the gating on of these SCR's for an adjustable time, as determined in bilevel adjustable delay circuits 133 and 153. FIG. 5f represents the delayed timing pulses, and the arrow through the first pulse signifies that the extent of the delay is adjustable. In addition to providing the delayed timing pulses to these circuits, it is also requisite that the appropriate semiconductor switch be triggered as related to the complementary switch which is already receiving continuous gate drive; for example, switch 23 is gated on after its complementary switch 24 is receiving an extended duration trigger pulse. To accomplish this the state of flip-flop 113 is signaled over conductors 122, 126 connected respectively to the cathodes of diodes 166, 168, adjacent the drive circuits 167 and 170. The low signal at the left of flip-flop 113 means, by the sense of connection of diode 127, that there is continuous gate drive over conductor 28 to SCR 24 at this time (FIG. 5g). However by reason of the connection of diode 168 in the opposite sense, the input side of gate drive circuit 170 is clamped at this time and prevents any trigger signal appearing on conductor 163 from passing over conductor 25 to gate on SCR 21. Thus, after the application of a timing signal from conductor 111 to the input side of bilevel adjustable gate circuit 133, at a time thereafter determined by the adjustable input signal applied to the bottom of circuit 133, a delayed trigger pulse issues over conductor 163 as represented in FIG. 5f. Because the gate drive circuit 170 is clamped by the signal received over conductor 126, the delayed trigger pulse is passed to gate driver 167 to apply a delayed trigger pulse over conductor 27 (FIG. 5h) to gate on SCR 23 and complete a path for current flow through winding 40 as shown in FIG. 1. With the next timing pulse on conductor 111, transistor 125 is briefly gated on to pass a momentary gating pulse (FIG. 5e) through circuit 121 and over conductor 26 to temporarily gate on SCR 22 and commutate SCR 23 as previously described. The lower portion of the delay circuit, including the gate drive circuits 175 and 177, operates in a similar manner.

The other waveforms in FIGS. 5j–5p are presented to assist in a complete and thorough understanding of the invention, especially the operation of the digital control circuit 45 illustrated in FIG. 4.

Although only a particular embodiment of the invention has been described and illustrated, it is apparent that various modifications and alterations may be made therein. It is therefore the intention in the appended claims to cover all such modifications and alterations as may fall within the true spirit and scope of the invention.

What is claimed is:

1. A system for energizing first and second AC loads from a DC input voltage by providing first and second resultant AC output voltages displaced in phase from each other, each resultant AC output voltage having a plurality of pulses in each half-cycle, which system comprises:

a first inverter circuit, connected for energization by the DC input voltage, including four controllable semiconductor switches connected to regulate both the direction and the level of current flow through the first AC load as different pairs of the semiconductor switches are rendered conductive;

a second inverter circuit, connected for energization by the DC input voltage, including four additional controllable semiconductor switches connected to regulate both the direction and the level of current flow through the second AC load as different pairs of the semiconductor switches in the second inverter circuit are rendered conductive; and a digital control circuit, connected to control the times of conduction of the controllable semiconductor switches, including first and second countdown circuits, the first countdown circuit being connected to determine the number of pulses in each half-cycle of the resultant AC output voltages, and the second countdown circuit being connected to maintain the resultant AC output voltages displaced in phase with respect to each other by a predetermined amount.

2. An energizing system as claimed in claim 1, in which said digital control circuit includes a clock circuit connected to provide a train of timing pulses for application to said first and second countdown circuits, a first flip-flop circuit coupled to said first countdown circuit and to two of the four controllable semiconductor switches in the first inverter circuit to provide first trigger pulses of a duration approximating a half-cycle of the resultant AC output voltages, and a second flip-flop circuit connected for regulation by said second countdown circuit and by said first flip-flop circuit, to provide second trigger pulses to two of the four controllable semiconductor switches in the second inverter circuit, which second trigger pulses are approximately equal in time duration but displaced in phase relative to the first trigger pulses, the extent of the phase displacement being determined by said second countdown circuit.

3. An energizing system as claimed in claim 2, in which said digital control circuit further includes a delay circuit connected to provide trigger pulses delayed in time relative to said timing pulses for application to those controllable semiconductor switches in the first and second inverter circuits which do not receive trigger pulses from either of the first and second flip-flop circuits, and means for adjusting the extent of the time delay between the delayed trigger pulses and the timing pulses.

4. An energizing system as claimed in claim 1, and further comprising a DC-to-DC converter circuit, coupled between a DC input circuit and said first and second inverter circuits, to prevent wide voltage swings in the DC input circuit from appearing in the inverter circuits.

5. An energizing system as claimed in claim 1, in which said first and second AC loads are the windings of a two-phase AC motor which is coupled to a mechanical load.

6. A system for energizing first and second AC loads from a DC input voltage by providing first and second composite AC output voltages displaced in phase relative to each other, each composite AC output voltage having a plurality of pulses in each half-cycle, which system comprises:

a first inverter connected for energization by the DC input voltage, including four controllable semiconductor switches connected to regulate both the direction and the level of current flow through the first AC load as different pairs of the semiconductor switches are turned on and off;

a second inverter connected for energization by the DC input voltage, including four additional controllable semiconductor switches connected to regulate both the direction and the level of current flow through the second AC load as different pairs of the semiconductor switches in the second inverter circuit are turned on and off; and a digital control circuit, connected to control the on and off times of the controllable semiconductor switches, including a clock circuit and first and second countdown circuits connected to receive timing pulses from the clock circuit, the first countdown circuit being connected to regulate the number of pulses in each half-cycle of the composite AC output voltages, and the second countdown circuit being connected to maintain the composite AC output voltages displaced in phase with respect to each other by a predetermined amount.

7. An energizing system as claimed in claim 6, in which said first and second AC loads are the windings of a two-phase electrical motor connected to drive a mechanical load.

8. An energizing system as claimed in claim 6, and further comprising a chopper circuit coupled between a DC input circuit and said first and second inverters, to minimize fluctuations in the DC input voltage supplied to the inverters.

9. An energizing system as claimed in claim 6, in which said digital control circuit includes a toggle flip-flop circuit coupled to said first countdown circuit and to two of the four controllable semiconductor switches in the first inverter to provide first trigger pulses of a duration approximately a half-cycle of the resultant AC output voltages, and a set-reset flip-flop circuit connected for regulation by said second countdown circuit and by the toggle flip-flop circuit, to provide second trigger pulses to two of the four controllable semiconductor switches in the second inverter, which second trigger pulses are approximately equal in time duration but displaced in phase relative to the first trigger pulses, the extent of the phase displacement being determined by said second countdown circuit.

10. An energizing system as claimed in claim 9, in which said digital control circuit further includes a bilevel, adjustable delay circuit connected to provide trigger pulses delayed in time relative to said timing pulses for application to those controllable semiconductor switches in the first and second inverters which are not switched by the first or second trigger pulses, and means for adjusting the extent of the time delay between the delayed trigger pulses and the timing pulses.

11. A system for energizing the first and second windings of a multiphase AC motor from a DC input voltage by providing first and second resultant AC output voltages displaced in phase by 90° relative to each other for application to the motor windings, each resultant AC output voltage having four pulses in each half-cycle, which system comprises:

a first inverter connected for energization by the DC input voltage, including four controllable semiconductor switches connected to regulate both the direction and the level of current flow through the first motor winding as different pairs of the semiconductor switches are turned on and off;

a second inverter connected for energization by the DC input voltage, including four additional controllable semiconductor switches connected to regulate both the direction and the level of current flow through the second motor winding as different pairs of the semiconductor switches in the second inverter circuit are turned on and off; and a digital control circuit, connected to provide trigger pulses which regulate the on and off times of the semiconductor switches, including a clock circuit for providing a series of timing pulses, a divide-by-4 circuit connected to receive the timing pulses, a JK flip-flop coupled to the divide-by-4 circuit and to first and second ones of the four semiconductor switches in the first inverter to provide a first set of trigger pulses of extended duration approximating a half-cycle of the resultant AC output voltages, an RS flip-flop circuit connected to provide a second set of trigger pulses to first and second ones of the semiconductor switches in the second inverter, which second set includes trigger pulses approximately equal in time duration but displaced in phase relative to the trigger pulses in the first set, a divide-by-2 circuit connected to receive the timing pulses and to provide output pulses for establishing and maintaining the phase displacement between the first and second sets of trigger pulses, circuit means, including the divide-by-2 circuit and the JK flip-flop, for regulating operation of the RS flip-flop, and a circuit for providing a third set of trigger pulses delayed relative to the timing pulses for application to the third and fourth semiconductor switches in both inverter circuits, including means for adjusting the extent of the time delay between the timing pulses and the third set of trigger pulses.